May 9, 1933.   O. W. RICHARDS ET AL   1,907,873

GEOMETRICAL INSTRUMENT

Filed March 2, 1932

OSCAR W. RICHARDS
PERCY M. ROOPE
INVENTORS

BY *J. A. Ellestad*

ATTORNEY

Patented May 9, 1933

1,907,873

UNITED STATES PATENT OFFICE

OSCAR W. RICHARDS, OF NEW HAVEN, CONNECTICUT, AND PERCY M. ROOPE, OF WORCESTER, MASSACHUSETTS

GEOMETRICAL INSTRUMENT

Application filed March 2, 1932. Serial No. 596,312.

This invention relates to geometrical instruments and more particularly it has reference to a device which can be used for directly measuring the tangent to a curve at any point or for precisely locating and drawing a tangent to a curve at any point.

One of the objects of our invention is to provide an improved device for directly measuring the tangent to a curve at any point and indicating the angle which the tangent makes with an axis. Another object is to provide an improved device for laying out and drawing a tangent to a curve. A further object is to provide means for accurately measuring and determining the slope of a line which is tangent to a curve at any point. These and other objects and advantages reside in certain novel features of construction, arrangement and combination of parts as will hereinafter be more fully described and pointed out in the appended claims.

Referring to the drawing.

Figure 1:
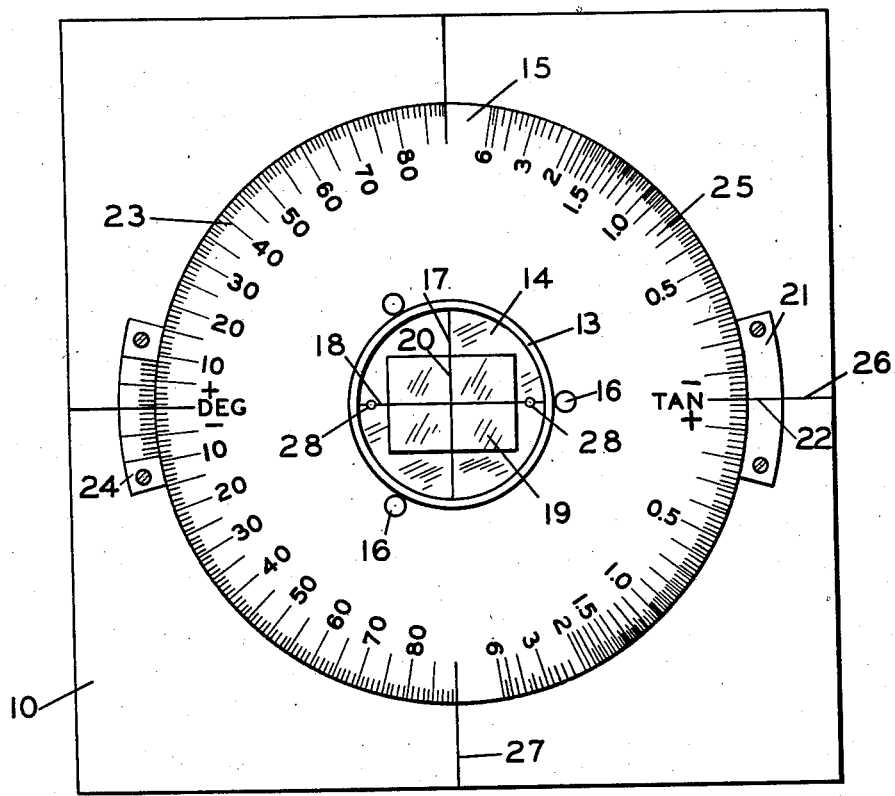
Fig. 1 is a top plan of a device embodying our invention.
Figure 2:
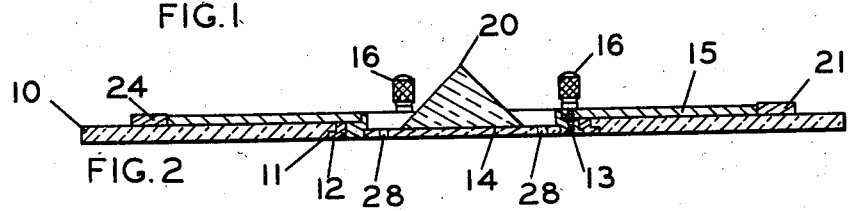
Fig. 2 is a vertical, central section of same.

One embodiment of our invention is illustrated in the drawing wherein 10 indicates a base plate which is preferably formed of a transparent material such as any of the well known cellulosic or other transparent materials. The base 10 has a central opening 11 within which is fixedly mounted a metal bearing ring 12. Rotatably mounted on the ring 12 is a mounting 13 to which a transparent glass plate 14 is fixedly secured. Positioned on top of base 10 is a circular metal plate 15 which is secured to the rotatable mounting 13 by means of three screws 16 so that the mounting 13 is held against the bearing 12 and the circular plate 15 is free to rotate together with the glass plate 14.

Ruled, etched or otherwise applied to glass plate 14 are the two fiducial lines 17 and 18 which are at right angles to each other. A triangular glass prism 19 is fixedly mounted on the top of glass plate 14 by cementing with Canada balsam, for example. The prism 19 may have an isosceles or equilateral form and it is so mounted that its apex edge 20 is parallel with fiducial line 17. Mounted on base 10 is a vernier plate 24 having a vernier which cooperates with a circular scale 23, engraved on plate 15, for indicating the angular position, in degrees, of plate 15. An index plate 21, secured to base 10, has an index line 22 which cooperates with the tangent scale 25 on plate 15 to indicate the value of the tangent, as will hereinafter be described. The transparent base 10 is also provided with the two reference lines 26 and 27 for indicating the $x$ and $y$ axes, respectively. The glass plate 14 is provided with two small apertures 28, shown in exaggerated size on the drawing for clearness. These two apertures are located in alignment along the fiducial line 18 for a purpose to be hereinafter described.

Figure 3:
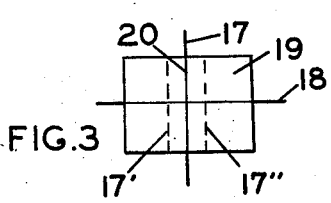
Figs. 3, 4 and 5 illustrate the operation and use of our device.
Figure 4:
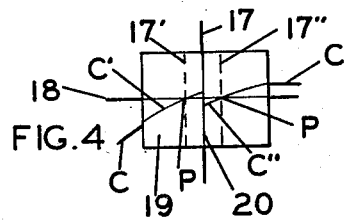
Figure 5:
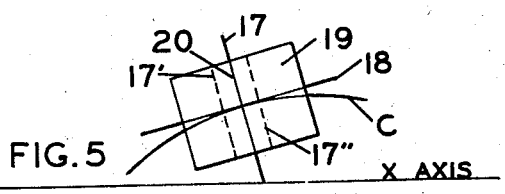

The operation of our device will now be described with reference to Figs. 3, 4 and 5. With the plate 15 positioned as in Fig. 1, an observer looking down from above the prism will see, due to the refractive effect of the prism, two images 17' and 17" of fiducial line 17, equally spaced from the vertical plane of the apex edge 20 of the prism, as shown in Fig. 3. Assuming now that it is desired to determine the value of a tangent to a curve C at a given point P, the device is placed on the sheet, bearing the curve, so that the point of intersection of line 18 and images 17' and 17" is positioned above the point P on the curve. The device is positioned so that line 26 is parallel to the $x$-axis of the graph. An observer upon looking down upon the prism will then, for example, see the images 17' and 17" and the two displaced branches C' and C" of the curve C, as shown in Fig. 4. The plate 15 together with prism 19 is then rotated by means of the projecting screws 16, until the two branches C' and C" are brought together to form a continuous curve when viewed through the prism, as shown in Fig. 5. By means of the index line 22, the value of the tangent, or slope, at the point P is then read directly from scale 25. The angle which the tangent makes with the $x$-axis is indicated in degrees by scale 23 and cooperating vernier 24. As shown on Fig. 1, the scales 23 and 25 are arranged to indicate the angles and tangents whether negative or positive.

If it is desired to actually draw a line which is tangent to the curve at point P, the settings are made as above outlined and then the tangent is located by marking the graph with a pin through the two apertures 28. The device is removed and the tangent is then drawn by connecting the two pin holes in the paper with a straight line. This provides a very accurate method for laying out and drawing a tangent to a curve.

From the foregoing, it is apparent that we are able to attain the objects of our invention and provide an improved device for directly measuring the tangent to a curve, determining the angle which a tangent makes with an axis and accurately locating and drawing a tangent to a curve. Although we have described a device having a transparent base plate and a metal scale plate, it is obvious that any suitable materials could be used. For example, both base and scale plate could be made of a transparent material. Our device provides a very rapid method for determining the tangent and also an accurate means for locating and drawing a tangent to a curve. Since a break in the continuity of a curve can be readily detected, the setting of the prism of our device is quite sensitive. It has been proposed to use reflecting rules for locating and drawing tangents and normals to curves. Such rules are based on the principle that a curve passes into its reflection without a bend, if the mirror is placed exactly at right angles to the curve. Small curves, or those which alternate considerably in their curvature cannot however, be determined with sufficient accuracy as the minor bends are difficult to recognize. Our device, however, provides rapid and accurate means for determining, locating and drawing tangents to curves.

Our instrument is of considerable use to those doing graphical work involving rates of change, especially in case the equation of the curve to be differentiated is unknown. Thus, a biologist can use the instrument for determining the rate of growth of an organism, at any time, from the growth curve. Engineers, physicists and others who deal with experimental, empirical or statistical matters will also find our device useful and convenient. For example, a transparent plate having fiducial lines and locating apertures can be surmounted by a fixed prism and used for accurately locating and drawing tangents to curves. Such, and other modifications of our invention will obviously occur to those skilled in the art.

We claim:
1. A device of the type described comprising a base, a glass plate mounted on said base, a triangular prism fixedly mounted on said plate, two mutually perpendicular fiducial lines beneath said prism, the apex edge of said prism being substantially parallel with one of said lines.

2. A device of the type described comprising a transparent plate having two perpendicular fiducial marks, a triangular prism mounted on said plate with one of its faces in contact with said plate, the apex edge of said prism being substantially parallel to one of said fiducial marks.

3. An instrument of the type described comprising a plate having a sight opening, a triangular prism mounted above said opening, means defining two perpendicular lines in fixed relation to and beneath said prism, the apex edge of said prism being parallel to one of the lines of said means.

4. An instrument of the type described comprising a transparent plate having means defining two fiducial lines at right angles to each other, optical means fixedly mounted on said plate for producing two laterally spaced images of one of said lines, said plate having two spaced apertures, said apertures being positioned along the other of said lines.

5. A device of the type described comprising a base having means defining two fiducial lines at right angles to each other, a glass plate mounted on said base, said plate having means defining two fiducial lines at right angles to each other and a triangular prism mounted on said plate one of its faces in contact with said plate, the apex edge of said prism being substantially parallel with one of said lines on said plate.

6. An instrument of the type described comprising a base, a member rotatably mounted on said base, a triangular prism mounted on said member, two mutually perpendicular indicating lines beneath said prism, the apex of said prism being substantially parallel to one of said lines and scale means for indicating the angular position of said member.

7. An instrument of the type described comprising a base having an opening, a member rotatably mounted on said base, said member having a centrally disposed transparent plate bearing crossed fiducial marks, a triangular prism mounted on said plate, the apex edge of said prism lying in the vertical plane of one of said marks, said plate having apertures positioned in alignment with the other of said marks.

8. An instrument of the type described comprising a base, a member rotatably mounted on said base, said member having two fiducial lines at right angles to each other, a triangular prism mounted on said member above said lines, the apex edge of the prism being parallel to one of said lines and scale means associated with said member for indicating the slope of the other of said lines.

9. An instrument of the type described comprising a base, an apertured member rotatably mounted on said base, a transparent plate mounted on said member, a triangular prism secured to said plate with one of its faces in contact with the plate, two fiducial devices positioned at right angles to each other beneath said prism, one of said fiducial devices lying in the plane of the apex edge of said prism, and scale means for indicating the angular position of said member.

10. A device of the type described comprising a triangular prism, a fiducial mark beneath one face of said prism, said mark being positioned in the vertical plane of the upper apex edge of said prism and means for rotating said prism about said mark.

11. In a device of the type described a triangular prism, fiducial line means beneath one face of said prism, said means being in fixed relation to said prism, said prism having an apex edge opposite said face, said means comprising means defining a line which is parallel to said edge and means defining another line which is perpendicular to and intersects said first named line below said apex edge.

12. A device of the type described comprising a member having means defining two mutually perpendicular lines, a triangular prism mounted above said member and in fixed relation thereto, the point of intersection of said lines being positioned in the vertical plane of the apex edge of the prism.

13. A device of the type described comprising a base having an opening, a member rotatably mounted in said opening, a transparent plate carried by said member, said plate having two mutually perpendicular fiducial lines, a triangular prism fixedly mounted on said plate, the point of intersection of said lines being positioned in the vertical plane of the apex edge of said prism, scale means for indicating the angles which one of said lines make with an axis and other scale means for indicating the tangents of the respective angles.

OSCAR W. RICHARDS.
PERCY M. ROOPE.